United States Patent
Tsai

(10) Patent No.: US 7,667,906 B2
(45) Date of Patent: Feb. 23, 2010

(54) LENS MODULE WITH MAGNETIC FOCUSING MECHANISM

(75) Inventor: Ming-Chiang Tsai, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 575 days.

(21) Appl. No.: 11/309,820

(22) Filed: Oct. 3, 2006

(65) Prior Publication Data

US 2007/0171551 A1    Jul. 26, 2007

(30) Foreign Application Priority Data

Jan. 20, 2006    (TW) .............................. 95102364 A

(51) Int. Cl.
*G02B 7/02* (2006.01)

(52) U.S. Cl. ....................... 359/824; 359/694; 359/814; 359/822

(58) Field of Classification Search ......... 359/813–814, 359/819–834, 694

See application file for complete search history.

(56) References Cited

U.S. PATENT DOCUMENTS 5,220,461 A    6/1993    Inoue

FOREIGN PATENT DOCUMENTS

CN    03247301.X A    8/2005
WO    WO 2005084013 A1 *    9/2005

* cited by examiner

*Primary Examiner*—Ramon M Barrera
(74) *Attorney, Agent, or Firm*—Steven M. Reiss

(57) ABSTRACT

An exemplary lens module includes a lens barrel (10), a lens (20) and a sleeve barrel (30). The lens barrel includes an adjusting magnet (15). The lens is mounted in the lens barrel. A part of the lens barrel is slidably mounted in the sleeve barrel, the sleeve barrel includes a positioning magnet group (33), and the positioning magnet group cooperates with the adjusting magnet to selectably position the lens barrel in at least two different positions in the sleeve barrel.

18 Claims, 2 Drawing Sheets

LENS MODULE WITH MAGNETIC FOCUSING MECHANISM

FIELD OF THE INVENTION

The present invention generally relates to lens modules and, more particularly, to a lens module with a magnetic focusing mechanism; the lens module being typically used in an optical device such as a microscope, a camera module, a digital camera module of a portable electronic device, or the like.

DESCRIPTION OF RELATED ART

With the ongoing development of microcircuitry and multimedia technologies, digital cameras are now in widespread use. In addition, high-end portable electronic devices, such as mobile phones and personal digital assistants (PDAs), are being developed to be increasingly multi-functional. Thus many of these portable electronic devices are now equipped with a digital camera module. These electronic devices enable consumers to enjoy capturing digital pictures anytime and anywhere. Nevertheless, there is increasing consumer demand for very high quality digital pictures.

In a typical camera module, the lens module thereof is very important to the quality of the pictures captured by the camera module. Generally, a lens module includes a lens and an image sensing module. Optical image signals are focused by the lens and then received by the image sensing module, whereupon the image sensing module transforms the optical image signals into electronic image signals. When a distance between the lens and the image sensing module is adjusted, the definition of the optical image signals received by the image sensing module is also changed.

In a typical lens module with a focusing mechanism, the focusing mechanism generally includes some drivers such as gearings or axles. When the lens module is used to take photos, the focusing mechanism appropriately adjusts the positions of some optical components of the lens module such as the lens and the image sensing module via the drivers. However, the focusing mechanism is liable to suffer from wear because of continual friction between the various parts, whereby the precision of the focusing mechanism is reduced.

Therefore, a new lens module is desired in order to overcome the above-described shortcomings.

SUMMARY OF THE INVENTION

In a preferred embodiment, a lens module includes a lens barrel, a lens and a sleeve barrel. The lens barrel includes an adjusting magnet. The lens is mounted in the lens barrel. A part of the lens barrel is slidably mounted in the sleeve barrel, the sleeve barrel includes a positioning magnet group, and the positioning magnet group cooperates with the adjusting magnet to selectably position the lens barrel in at least two different positions in the sleeve barrel.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present lens module. Moreover, in the drawings, like reference numerals designate corresponding parts through out the views.

DETAILED DESCRIPTION OF THE INVENTION

Figure 1:
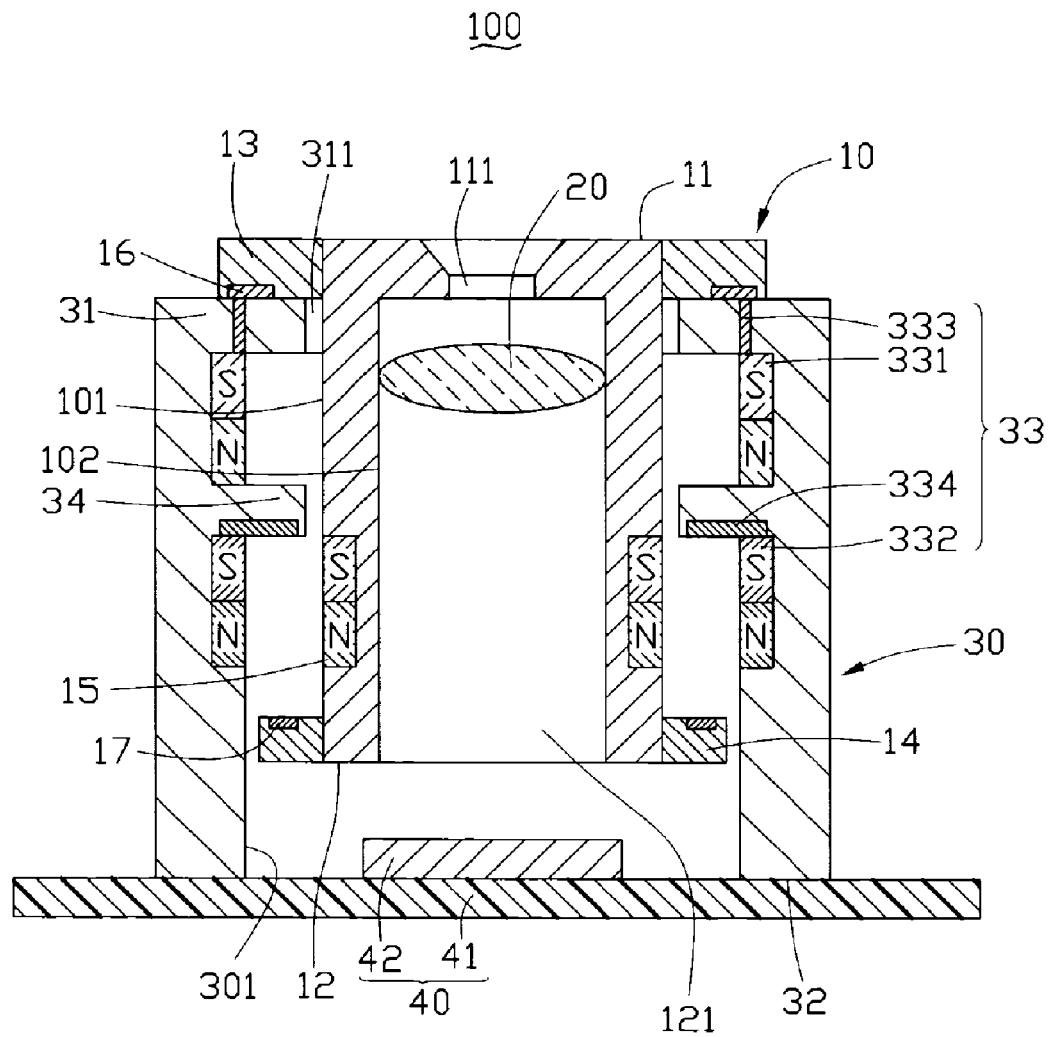
FIG. 1 is a cutaway view of a lens module in accordance with a preferred embodiment of the present invention, showing the lens module in a state in which it is used to take long distance photos.

Referring now to the drawings in detail, FIG. 1 shows a lens module 100 in accordance with a preferred embodiment of the present invention. The lens module 100 includes a lens barrel 10, a lens 20, a sleeve barrel 30, and an image sensing module 40. The lens 20 is mounted in the lens barrel 10, and the lens barrel 10 is mounted in the sleeve barrel 30. The image sensing module 40 is mounted on an end of the sleeve barrel 30.

The lens barrel 10 is a substantially hollow cylinder in shape, and includes an outer surface 101, a first inner surface 102, an aperture end 11, an image sensing end 12, a front stopper 13, a back stopper 14, an adjusting magnet 15, a first positioning member 16, and a second positioning member 17. The image sensing end 12 is located opposite to the aperture end 11. The lens barrel 10 defines an aperture 111 in a center of the aperture end 11, and an image sensing opening 121 in a center of the image sensing end 12.

The front stopper 13 is an annular block fixed to the outer surface 101 at the aperture end 11. The back stopper 14 is an annular block fixed to the outer surface 101 at the image sensing end 12. The adjusting magnet 15 is an annular permanent magnet, which is secured in an annular recess defined in the lens barrel 10 at the outer surface 101 between the front stopper 13 and the back stopper 14. Thereby, an outer surface of the adjusting magnet 15 is flush with the outer surface 101. The south magnetic pole of the adjusting magnet 15 is oriented towards the aperture end 11, and the north magnetic pole of the adjusting magnet 15 is oriented towards the image sensing end 12. The first positioning member 16 is an annular ferromagnet, which is secured in an annular recess defined in a back side of the front stopper 13. The second positioning member 17 is an annular ferromagnet, which is secured in an annular recess defined in a front side of the back stopper 14.

The lens 20 is a typically a round biconvex lens. A peripheral configuration of the lens 20 is shaped to correspond to a shape of the first inner surface 102, so that the lens 20 can be securely mounted in the lens barrel 10.

The sleeve barrel 30 is substantially a hollow cylinder in shape, and includes a second inner surface 301, an adjusting end 31, a mounting end 32, a positioning magnet group 33, and a limiting block 34. The mounting end 32 is located opposite to the adjusting end 31. The limiting block 34 is located between the mounting end 32 and the adjusting end 31. The sleeve barrel 30 defines an adjusting opening 311 in a center of the adjusting end 31. A diameter of the adjusting opening 311 is larger than a diameter of the outer surface 101, and less than an outer diameter of the front stopper 13.

The positioning magnet group 33 includes a first positioning magnet 331, a second positioning magnet 332, a first magnetizer 333, and a second magnetizer 334. The first positioning magnet 331 is an annular permanent magnet, which is secured in an annular recess defined in the sleeve barrel 30 at the second inner surface 301 adjacent to the adjusting end 31. The second positioning magnet 332 is an annular permanent magnet, which is secured in an annular recess defined in the sleeve barrel 30 at the second inner surface 301 adjacent to a back of the limiting block 34. An inner diameter of the first positioning magnet 331 and an inner diameter of the second positioning magnet 332 are both larger than both the diameter of the outer surface 101 and an outer diameter of the back stopper 14. The south magnetic pole of the first positioning magnet 331 and the south magnetic pole of the second positioning magnet 332 are both oriented towards the adjusting end 31. The north magnetic pole of the first positioning magnet 331 and the north magnetic pole of the second positioning magnet 332 are both oriented towards the mounting end 32.

The first magnetizer 333 and the second magnetizer 334 are both annular ferromagnets. The limiting block 34 is an annular protrusion projecting inward from the second inner surface 301, and is located between the first positioning magnet 331 and the second positioning magnet 332. An inner diameter of the limiting block 34 is larger than the diameter of the outer surface 101, and less than the outer diameter of the back stopper 14. The first magnetizer 333 is installed in the adjusting end 31, such that an annular back side of the first magnetizer 333 is in contact with the first positioning magnet 331, and an annular front side of the first magnetizer 333 is exposed at a front face of the adjusting end 31. The second magnetizer 334 is installed in an annular recess defined in a back side of the limiting block 34, such that an inner portion of an annular back side of the second magnetizer 334 is exposed at a back face of the limiting block 34, and an outer portion of the annular back side of the second magnetizer 334 is in contact with the second positioning magnet 332.

The image sensor module 40 includes a base 41 and an image sensor 42. The image sensor 42 is secured to a front side of the base 41.

In assembly, the lens 20 is coaxially mounted in the lens barrel 10. In further or alternative embodiments, one or more other lenses can be mounted in the lens barrel 10. The back stopper 14 is fixed around the outer surface 101 of the lens barrel 10 at the image sensing end 12. This subassembly is then inserted into the sleeve barrel 30 via the mounting end 32, so that the aperture end 11 of the lens barrel 10 protrudes out from the adjusting opening 311 of the adjusting end 31 of the sleeve barrel 30. The front stopper 13 is then fixed around the outer surface 101 at the aperture end 11. Thus the front stopper 13 is located outside of the sleeve barrel 30, and the adjusting end 31 and the limiting block 34 are both located between the front stopper 13 and the back stopper 14. With this configuration, a part of the lens barrel 10 is slidably mounted in the sleeve barrel 30, the lens barrel 10 can move forward until the back stopper 14 is stopped by the limiting block 34, and the lens barrel 10 can move rearward until the front stopper 13 is stopped by the adjusting end 31. When the front stopper 13 is stopped by the adjusting end 31, the first positioning member 16 comes into contact with the first magnetizer 333, and the first positioning magnet 331 attracts the first positioning member 16 via the first magnetizer 333. When the back stopper 14 is stopped by the limiting block 34, the second positioning member 17 comes into contact with the second magnetizer 334, and the second positioning magnet 332 attracts the second component 17 via the second magnetizer 334. Finally, the base 41 of the image sensing module 40 is mounted on the mounting end 32, so that the image sensor 42 is aligned with the image sensing opening 121.

When the lens module 100 is used to take photos of objects at a long distance, the lens barrel 10 is driven by a driving mechanism (not shown) to move rearward until the front stopper 13 is stopped by the adjusting end 31. When the front stopper 13 is stopped by the adjusting end 31, the first positioning member 16 comes into contact with the first magnetizer 333, and the first positioning magnet 331 attracts the first positioning member 16 via the first magnetizer 333. In this way, the lens barrel 20 is prevented from moving axially, the lens 20 is located relatively close to the image sensor 42, and the lens module 100 is capable of taking photos of objects at a long distance.

At the same time, the second positioning magnet 332 is located around the adjusting magnet 15. The south magnetic pole of the adjusting magnet 15 is adjacent to the south magnetic pole of the second positioning magnet 332, and the north magnetic pole of the adjusting magnet 15 is adjacent to the north magnetic pole of the second positioning magnet 332. Thus a whole periphery of the adjusting magnet 15 is repulsed by the second positioning magnet 332 towards a center of the second positioning magnet 332, so that the lens barrel 10 is prevented from coming into contact with the sleeve barrel 30. As a result, friction between the lens barrel 10 and the sleeve barrel 30 is eliminated, and a working lifetime of the lens module 100 is prolonged.

If the lens barrel 10 moves radially from the center of the second positioning magnet 332, a first side of the adjusting magnet 15 comes closer to the second positioning magnet 332, and the repulsion between the first side of the adjusting magnet 15 and the second positioning magnet 332 increases. Additionally, an opposite second side of the adjusting magnet 15 moves farther from the second positioning magnet 332, and the repulsion between the second side of the adjusting magnet 15 and the second positioning magnet 332 decreases. In this way, radial movement of the lens barrel 10 is soon stopped by the increasing repulsion between the first side of the adjusting magnet 15 and the second positioning magnet 332, and the lens barrel 10 is repulsed back to the center of the second positioning magnet 332 again. When the adjusting magnet 15 is in the center of the second positioning magnet 332, the repulsion between the adjusting magnet 15 and the second positioning magnet 332 is equal in all radial directions. Thus the lens barrel 10 is suspended in the center of the second positioning magnet 332. In this way, the lens barrel 10 resists being displaced radially, and remains coaxially positioned in the sleeve barrel 30. Accordingly, the image sensor 42 remains aligned with the image sensing opening 121 to receive optical image signals focused by the lens 20.

Figure 2:
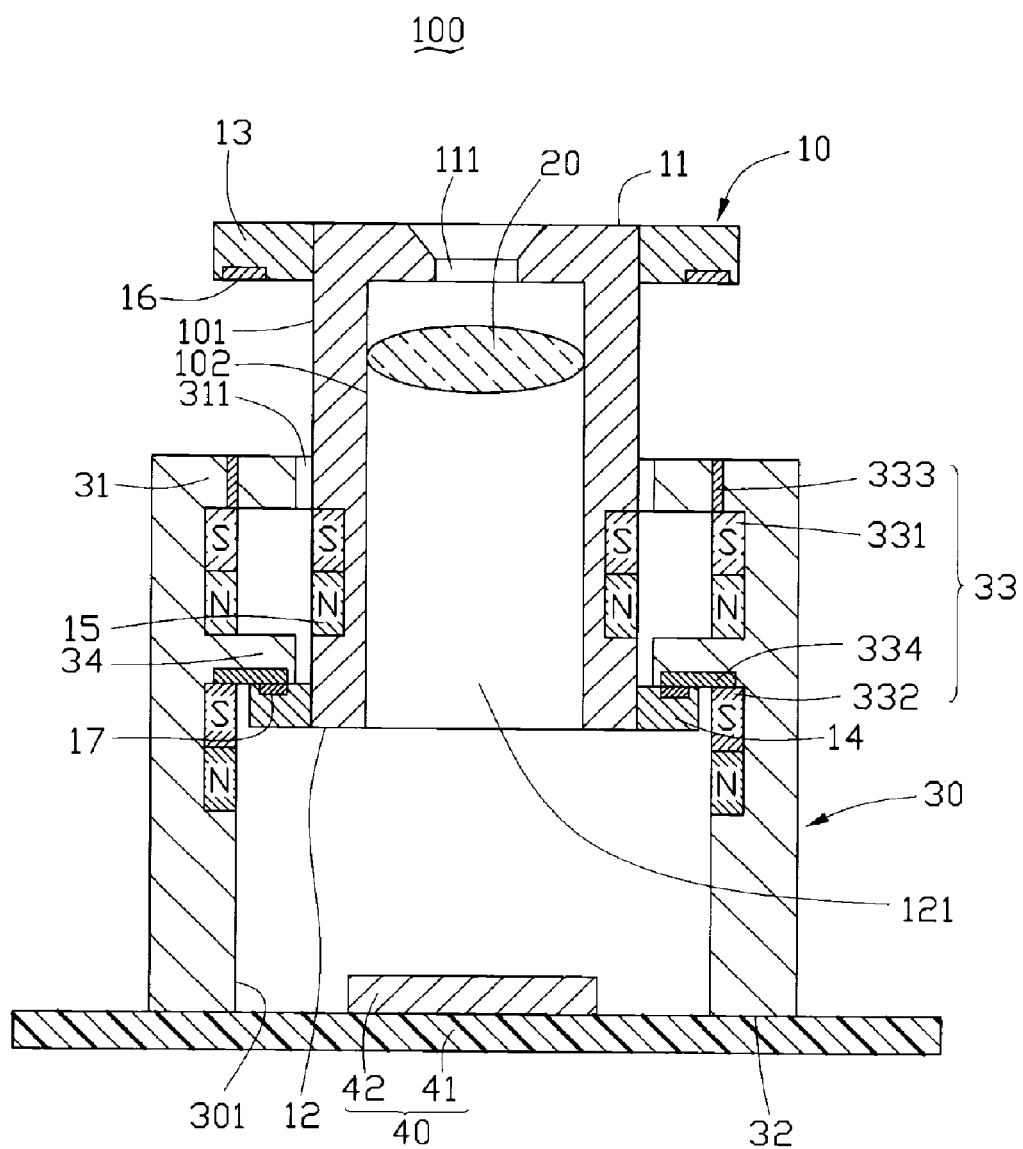
FIG. 2 is similar to FIG. 1, but showing the lens module in a state in which it is used to take photos of objects at close range.

Also referring to FIG. 2, when the lens module 100 is used to take photos of objects at a short distance, the lens barrel 10 is driven by the driving mechanism to move forward until the back stopper 14 is stopped by the limiting block 34. When the back stopper 14 is stopped by the limiting block 34, the second positioning member 17 comes into contact with the second magnetizer 334, and the second positioning magnet 332 attracts the second positioning member 17 via the second magnetizer 334. In this way, the lens barrel 10 is prevented from moving axially, the lens 20 is located far from the image sensor 42, and the lens module 100 is capable of taking photos of objects at a short distance.

At the same time, the first positioning magnet 331 is located around the adjusting magnet 15. The south magnetic pole of the adjusting magnet 15 is adjacent to the south magnetic pole of the first positioning magnet 331, and the north magnetic pole of the adjusting magnet 15 is adjacent to the north magnetic pole of the first positioning magnet 331. Thus a whole periphery of the adjusting magnet 15 is repulsed by the first positioning magnet 331 towards a center of the first positioning magnet 331, so that the lens barrel 10 is prevented from coming into contact with the sleeve barrel 30. As a result, friction between the lens barrel 10 and the sleeve barrel 30 is eliminated, and a working lifetime of the lens module 100 is prolonged.

If the lens barrel 10 moves radially from the center of the first positioning magnet 331, the repulsion between the adjusting magnet 15 and the second positioning magnet 331 stops the lens barrel 10 moving radially and repels the lens barrel 10 back to the center of the first positioning magnet 331 again. When the adjusting magnet 15 is in the center of the first positioning magnet 331, the repulsion between the adjusting magnet 15 and the first positioning magnet 331 is equal in all radial directions. Thus the lens barrel 10 is suspended in the center of the first positioning magnet 331. In this way, the lens barrel 10 resists being displaced radially, and remains coaxially positioned in the sleeve barrel 30. Accordingly, the image sensor 42 remains aligned with the image sensing opening 121 to receive optical image signals focused by the lens 20.

Understandably, the above-described magnetic repulsion means that the lens barrel 10 resists being displaced radially, and can remain in a desired correct position in the sleeve barrel 30. That is, the magnetic repulsion can prevent friction occurring between the lens barrel 10 and the sleeve barrel 30.

In an alternative embodiment, the orientations of the magnetic poles of the adjusting magnet 15, the first positioning magnet 331 and the second positioning magnet 332 can all be reversed compared to the above-described embodiment. In such alternative embodiment, the south magnetic poles of the adjusting magnet 15, the first positioning magnet 331 and the second positioning magnet 332 are all oriented towards the image sensing end 12, and the north magnetic poles of the adjusting magnet 15, the first positioning magnet 331 and the second positioning magnet 332 are all oriented towards the aperture end 11.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens module, comprising:
a lens barrel, the lens barrel including an outer surface, an aperture end, an image sensing end located opposite to the aperture end, a front stopper, a back stopper and an adjusting magnet; the lens barrel defining an aperture in the aperture end and an image sensing opening in the image sensing end; the front stopper being an annular block fixed to an outside of the aperture end, and the back stopper being an annular block fixed to an outside of the image sensing end;
a lens, the lens being mounted in the lens barrel; and
a sleeve barrel, a part of the lens barrel being slidably mounted in the sleeve barrel, the sleeve barrel including a positioning magnet group, the positioning magnet group cooperating with the adjusting magnet to selectably position the lens barrel in at least two different positions in the sleeve barrel.

2. The lens module as claimed in claim 1, wherein the adjusting magnet is an annular permanent magnet, and is secured in an annular recess defined in the lens barrel at the outer surface between the front stopper and the back stopper.

3. The lens module as claimed in claim 1, wherein the lens barrel includes a first positioning member and a second positioning member, the first positioning member is an annular ferromagnet secured in an annular recess defined in a back side of the front stopper, and the second positioning member is an annular ferromagnet secured in an annular recess defined in a front side of the back stopper.

4. The lens module as claimed in claim 1, wherein the sleeve barrel includes an adjusting end, the adjusting end defines an adjusting opening therein, and a diameter of the adjusting opening is larger than a diameter of the outside of the lens barrel and less than an outer diameter of the front stopper.

5. The lens module as claimed in claim 4, wherein the sleeve barrel includes an inner surface, the positioning magnet group includes a first positioning magnet and a second positioning magnet, the first positioning magnet is an annular permanent magnet secured in the sleeve barrel at the inner surface, the second positioning magnet is an annular permanent magnet secured in the sleeve barrel at the inner surface, and the first positioning magnet is nearer the adjusting end than the second positioning magnet.

6. The lens module as claimed in claim 5, wherein an inner diameter of the first positioning magnet and an inner diameter of the second positioning magnet are both larger than both the diameter of the outside of the lens barrel and an outer diameter of the back stopper.

7. The lens module as claimed in claim 5, wherein the sleeve barrel includes a limiting block, which is an annular protrusion projecting inward from the inner surface thereof between the first positioning magnet and the second positioning magnet, and an inner diameter of the limiting block is larger than the diameter of the outside of the lens barrel and less than the outer diameter of the back stopper.

8. The lens module as claimed in claim 7, wherein the positioning magnet group includes a first magnetizer and a second magnetizer, the first magnetizer is an annular ferromagnet installed in the adjusting end and is in contact with the first positioning magnet, and the second magnetizer is an annular ferromagnet installed in the limiting block and is in contact with the second positioning magnet.

9. The lens module as claimed in claim 5, wherein south magnetic poles of the adjusting magnet, the first positioning magnet, and the second positioning magnet are all oriented towards the adjusting end of the sleeve barrel, or are all oriented towards an end of the sleeve barrel opposite from the adjusting end.

10. The lens module as claimed in claim 4, wherein the lens module includes an image sensing module, the sleeve barrel includes a mounting end located opposite to the adjusting end, and the image sensing module is mounted on the mounting end and aligned with the image sensing opening.

11. The lens module as claimed in claim 1, further comprising at least one additional lens, wherein the lens barrel includes an inner surface, and a peripheral configuration of each of the lenses is shaped to correspond to a shape of the inner surface such that the lenses are securely mounted in the lens barrel.

12. A lens module, comprising:
a lens barrel including a first inner surface, an outer surface, an aperture end, an image sensing end located opposite to the aperture end and an adjusting magnet; the lens barrel defining an aperture in the aperture end and an image sensing opening in the image sensing end, and the adjusting magnet secured in the lens barrel at the outer surface;
a lens being mounted in the lens barrel; and
a sleeve barrel including a second inner surface and a positioning magnet group, the positioning magnet group including a first positioning magnet and a second positioning magnet, both the first positioning magnet and the second positioning magnet being annular permanent magnets secured in the sleeve barrel at the second inner surface, and the first positioning magnet is nearer to the aperture end of the lens barrel than the second positioning magnet; a part of the lens barrel being movably mounted in the sleeve barrel and being radially centered in the sleeve barrel by magnetic repulsion, and the positioning magnet group cooperating with the adjusting magnet to selectably position the lens barrel in at least two different positions in the sleeve barrel.

13. The lens module as claimed in claim 12, wherein south magnetic poles of the adjusting magnet, the first positioning magnet, and the second positioning magnet are all oriented towards a front end of the lens module, or are all oriented towards a back end of the lens module.

14. The lens module as claimed in claim 12, wherein the lens module includes an image sensing module, the sleeve barrel includes a mounting end, and the image sensing module is mounted on the mounting end and aligned with the image sensing opening.

15. The lens module as claimed in claim 12, wherein the lens barrel includes a front stopper and a back stopper, the front stopper is an annular block fixed to an outside of the aperture end, the back stopper is an annular block fixed to an outside of the image sensing end.

16. The lens module as claimed in claim 15, wherein the adjusting magnet is an annular permanent magnet, and is secured in an annular recess defined in the lens barrel at the outer surface between the front stopper and the back stopper.

17. The lens module as claimed in claim 15, wherein the sleeve barrel includes a limiting block, which is an annular protrusion projecting inward from the inner surface thereof between the first positioning magnet and the second positioning magnet, and an inner diameter of the limiting block is larger than the diameter of the outside of the lens barrel and less than the outer diameter of the back stopper.

18. The lens module as claimed in claim 17, wherein the positioning magnet group includes a first magnetizer and a second magnetizer, the first magnetizer is an annular ferromagnet installed in the adjusting end and is in contact with the first positioning magnet, and the second magnetizer is an annular ferromagnet installed in the limiting block and is in contact with the second positioning magnet.

* * * * *

UNITED STATES PATENT AND TRADEMARK OFFICE
CERTIFICATE OF CORRECTION

PATENT NO.        : 7,667,906 B2                                    Page 1 of 1
APPLICATION NO. : 11/309820
DATED             : February 23, 2010
INVENTOR(S)       : Ming-Chiang Tsai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 718 days.

Signed and Sealed this

Seventh Day of December, 2010

David J. Kappos
*Director of the United States Patent and Trademark Office*